United States Patent
Shah

(10) Patent No.: US 8,321,246 B1
(45) Date of Patent: Nov. 27, 2012

(54) LOCATION CHECK-IN VIA SHORT RANGE COMMUNICATION

(75) Inventor: Chirag Shah, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/247,374

(22) Filed: Sep. 28, 2011

(51) Int. Cl.
*G06F 17/30* (2006.01)

(52) U.S. Cl. .......................................... 705/5; 707/770

(58) Field of Classification Search ............. 707/613, 707/623, 625, 759, 764, 770, 781, 783, 788, 707/787; 705/1.1, 14.51, 14.57, 14.58, 14.6, 705/14.63, 31, 33, 35, 44, 50, 75, 5, 6; 709/217, 709/219, 227; 726/27
See application file for complete search history.

(56) References Cited

U.S. PATENT DOCUMENTS

| | | | |
|---|---|---|---|
| 2003/0208386 A1* | 11/2003 | Brondrup | 705/5 |
| 2008/0071587 A1* | 3/2008 | Granucci et al. | 705/5 |
| 2009/0094072 A1* | 4/2009 | Rodenberg | 705/5 |
| 2010/0078475 A1 | 4/2010 | Lin et al. | |
| 2010/0082485 A1 | 4/2010 | Lin et al. | |
| 2010/0268646 A1* | 10/2010 | Erickson | 705/44 |
| 2011/0022484 A1* | 1/2011 | Smith et al. | 705/17 |
| 2011/0209201 A1* | 8/2011 | Chollat | 726/4 |
| 2011/0276478 A1* | 11/2011 | Hirson et al. | 705/40 |
| 2012/0059700 A1* | 3/2012 | Darbyshire | 705/14.16 |

OTHER PUBLICATIONS

"Checking in with NFC-Some Social-Networking Start-ups to Use NFC," [online]. Forthwrite Media SARL and NFC Times 2011. First accessed on May 12, 2011. Retrieved from the Internet: <http://www.nfctimes.com/news/social-networking-start-ups-use-nfc-others-look-technology> (8 pgs).

Melanson, "Foursquare tries out an NFC-based check-in system at its HQ," [online]. engadget Mar. 12, 2011. First accessed on May 12, 2011. Retrieved from the Internet: <http://www.engadget.com/2011/03/12/foursquare-tries-out-an-nfc-based-check-in-system-at-its-hq/> (8 pgs).

Resatsch, "Location-based Services—Mobile Monday Berlin 2009—Florian Resatsch—Servtag", [online]. Slideshare Sep. 7, 2009. First accessed on May 12, 2011. Retrieved from the Internet: <http://www.slideshare.net/resatsch/locationbased-services-mobile-berlin-2009-florian-resatsch-servtag> (6 pgs).

* cited by examiner

*Primary Examiner* — Greta Robinson

(74) *Attorney, Agent, or Firm* — Shumaker & Sieffert, P.A.

(57) ABSTRACT

In general, techniques and systems for updating a user status with check-in information in a user account are described. In one example, a method includes obtaining, with a computing device, location information from a target device using near field communication (NFC), retrieving check-in information based on the location information obtained from the target device, wherein the check-in information comprises greater detail about a destination associated with the target device than the location information, and updating a user status in a user account with the check-in information. In some examples, the location information may instruct the computing device to retrieve check-in information from at least one information source different from the target device.

19 Claims, 7 Drawing Sheets

LOCATION CHECK-IN VIA SHORT RANGE COMMUNICATION

TECHNICAL FIELD

This disclosure relates to posting information related to a user from a computing device.

BACKGROUND

A user may interact with applications executing on a computing device (e.g., mobile phone, tablet computer, smart phone, or the like). For instance, a user may install, view, or delete an application on a computing device.

In some instances, a user may use a mobile device (e.g., mobile phone, tablet computer, smart phone, or the like) to communicate with other devices or systems. For instance, a user may transmit information from the mobile device to a remote computing device.

SUMMARY

In one example, a method includes obtaining, with a computing device, location information from a target device using near field communication (NFC), retrieving check-in information based on the location information obtained from the target device, wherein the check-in information comprises greater detail about a destination associated with the target device than the location information; and updating a user status in a user account with the check-in information.

In another example, a computer-readable storage medium is encoded with instructions that cause one or more processors of a computing device to obtain, with a computing device, location information from a target device using near field communication (NFC), retrieve check-in information based on the location information obtained from the target device, wherein the check-in information comprises greater detail about a destination associated with the target device than the location information, and update a user status in a user account with the check-in information.

In another example, a computing device includes a near field communication (NFC) module configured to obtain location information from a target device and a processor configured to retrieve check-in information based on the location information obtained from the target device, wherein the check-in information comprises greater detail about a destination associated with the target device than the location information, and update a user status in a user account with the check-in information.

The details of one or more aspects of this disclosure are set forth in the accompanying drawings and the description below. Other features, objects, and advantages of the disclosure will be apparent from the description and drawings, and from the claims.

DETAILED DESCRIPTION

Figure 1:
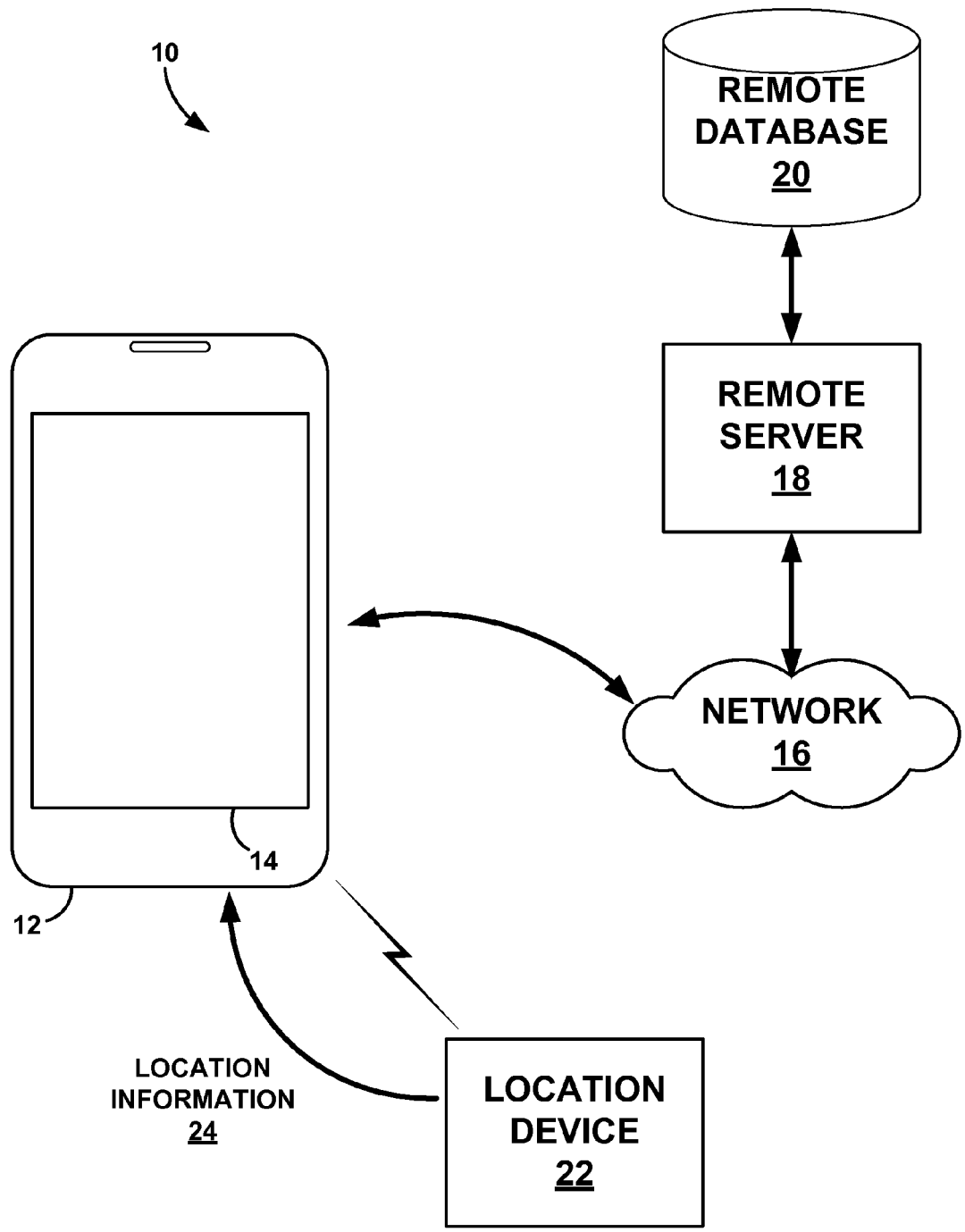
FIG. 1 is a conceptual diagram illustrating an example user computing device that is configured to update a user status based on location information obtained from a location device, in accordance with one or more aspects of the present disclosure.

In general, this disclosure is directed to techniques for using near field communication (NFC) to at least partially automate a user check-in processes for a user account (e.g., a user account associated with a social networking service). Typically, a user is required to perform several manual steps in order to "check-in," or update the user's account to share the user's location with other contacts. These manual steps of the check-in process may include opening a social networking application associated with the social networking service, entering or typing the user's location, and updating the user's status with the entered location.

Techniques of this disclosure may, in various instances, enable a user to complete the check-in process with little or no user input by utilizing a location device (e.g., an NFC target or tag) associated with the location of the user. Location devices may be provided by businesses, restaurants, movie theaters, schools, events, sporting arenas, or any other location that the user may visit. Therefore, each location device may provide different location information specific to that particular location device.

When an NFC module is enabled within a user's computing device (e.g., a mobile phone or tablet computing device) the user may "tap" the computing device against the location device or otherwise place the computing device within sufficient proximity of the location device. The NFC module of the user's computing device may, in various instances, power the location device to subsequently obtain location information from the location device. The computing device may then retrieve check-in information based on the location information and subsequently update the user account with the check-in information. For example, the updated user account may be presented as check-in information in the user's status or other area of the user account. Although the user account may be associated with a social networking service, the user account may be any other web-accessible page with information about the user, such as a website or a blog.

The location information obtained from the location device may not directly provide the check-in information used to update the user account. Instead, the location information may function as a pointing device that instructs the computing device on where to retrieve more detailed check-in information appropriate for updating the user account. In this manner, the location device may only need to store and provide a small amount of data for the location information. The check-in information may then include greater detail, or additional details, about the destination associated with the target device than the location information. The check-in information may also be formatted to be placed in the user status (e.g., information readable or usable by a user), but the location information may include a command or other instructions that is then executed by the user computing device. The check-in information may also be updated without needing to modify the location information stored by the location device. For example, the location information may include latitude and longitude coordinates that the user computing device provides to an Internet-based mapping service in order to retrieve the check-in information from the Internet-based mapping service. In another example, the location information may include a website address that the user computing device can use to access and download the check-in information from a server or other computing device via a network.

Although the user computing device may completely automate the check-in process such that no user input is required subsequent to placing the computing device close proximity to the location device, the computing device may prompt the user for input during the check-in process. In some examples, the computing device may prompt the user to confirm the check-in information before updating the user account with the check-in information. In other examples, the computing device may present a list of preselected contact groups, selectable by the user, that will be able to view the updated check-in information. In additional examples, the computing device may present destination information from which the user may select one or more elements to include in the check-in information. After the user makes any selections, the computing device may accordingly update the user account with the check-in information.

FIG. 1 is a conceptual diagram illustrating example user computing device 12 that is configured to update a user account based on location information obtained from location device 22. As shown in FIG. 1, system 10 includes computing device 12, location device 22, network 16, remote server 18, and remote database 20. Computing device 12, in some examples, is or is a part of a portable computing device (e.g., a mobile phone, a netbook, a notebook, or a tablet device). In other examples, computing device 12 may be at least a part of a digital camera, a music player, or any other device that a user may carry or move between different locations. Computing device 12 may also connect to network 16 (a wired or wireless network).

Computing device 12 may include an NFC module (not shown) capable of initiating wireless communication with location device 22, a target device, over a short distance. For example, this short distance may be less 100 meters, less than 10 meters, less than 1 meter, or even less than 10 centimeters. Although only one location device 22 is provided in the example of FIG. 1, location device 22 is representative of any number of location devices configured to communicate with computing device 12 using an NFC protocol. Since each location device 22 may be relatively simple and configured to communicate with any number of other NFC devices, computing device 12 may be capable of establishing communication with thousands or even millions of different location devices.

Computing device 12 may operate in at least two different modes to communicate with location device 22 using NFC. For example, computing device 12 and location device 22 may be configured to operate in a passive mode and an active mode of operation. In an active mode of operation, computing device 12 may generate a first radio field that is received by location device 22 in physical proximity to computing device 12. In response, location device 22 may generate a second radio field that is received by computing device 12. In this way, data may be communicated between computing device 12 and location device 22 such as using peer-to-peer communication. In the active mode, computing device 12 may also power or activate a passive device to retrieve data from the passive device, as further described below.

In a passive mode of operation, load modulation techniques may be employed to facilitate data communication between computing device 12 and location device 22. In a passive mode, location device 22 does not generate a radio field in response to the radio field of computing device 12. Instead, location device 22 may include electrical hardware (e.g., an NFC module) that generates a change in impedance in response to the radio field generated by computing device 12. For example, computing device 12 may generate a radio field that is received by location device 22. Electrical hardware in location device 22 may generate a change in impedance in response to the radio field. The change in impedance may be detected by the NFC module of computing device 12. In this way, load modulation techniques may be used by computing device 12 to obtain location information 24 from location device 22. In other words, computing device 12 may obtain location information 24 from location device 22, but location device 22 would not receive any data from computing device 12 in the passive mode. Other well-known modulation techniques including phase modulation and/or amplitude modulation may also be employed to facilitate data communication between computing device 12 and location device 22 in other examples.

Generally, location device 22 may operate in passive mode. In passive mode, location device 22 may be referred to as an NFC tag or NFC target. In other words, computing device 12 may include active NFC hardware and location device 22 may include passive NFC hardware. Since a passive location device 22 does not need a dedicated power supply, location device 22 may be placed in a variety of locations, on any surface, or even as part of smaller items. For example, location device 22 may be embodied as a sticker or adhesive poster that is placed on the wall of a building. Passive location devices 22 may also be less expensive and more difficult to corrupt with computing device 12. In this manner, location device 22 may include electrical hardware that generates a change in impedance in response to a radio field. However, location device 22 may be another computing device in other examples. For example, location device 22 may be a computing device that operates in a passive NFC mode and/or an active NFC mode. In other words, location device 22 may include active NFC hardware. This active NFC hardware may be configured to emulate passive NFC hardware or participate in active near field communication.

In an example of a passive location device 22, location device 22 may deliver location information 24 to computing device 12 in response to receiving a radio field generated by the NFC module of computing device 12. In other words, location information 24 may be data stored on location device 22. Upon receiving the radio field (e.g., receiving power sufficient to transmit data) computing device 12 may receive location information 24. In this manner, location device 22 may only be capable of delivering or sending location information 24 when computing device 12 is within close physical proximity to location device 22. Although the user may physically touch, bump, or tap computing device 12 to location device 22, computing device 12 may be capable of receiving location information 24 from location device 22 without physically touching location device 22.

Location information 24 may not include the check-in information posted to the user status of the user account. Instead, location information 24 may act as a pointing device, or include instructions, regarding where computing device 12 can retrieve the check-in information. In this manner, location information 24 may instruct computing device 12 to retrieve check-in information from at least one information source different from location device 22. For example, computing device 12 may retrieve check-in information, or at least a portion of the check-in information, from a database stored within computing device 12. Computing device 12 may store check-in information for a variety of destinations that have a location device 22, and location information 24 obtained from each particular location device 22 may instruct computing device to select predetermined check-in information from the database or other specified resource that is associated with the obtained location information 24. In some examples, computing device 12 may retrieve the check-in information from a cache stored in computing device 12, such as cached mapping data. Location information 24 may thus include a URL or other command that computing device 12 uses to retrieve the cached information.

In another example, location information 24 may include latitude and longitude coordinates that identify the geographical location of location device 22 (e.g., the associated destination to which the user is checking-in). Computing device 12 may use the coordinates to identify the destination from geographical mapping information stored in the memory of computing device 12 and generate check-in information based on the identified destination. The check-in information may include the destination name, a summary describing the destination, a map link to a geographical area around the destination, or any other information associated with the destination that corresponds to the latitude and longitude coordinates.

Computing device 12 may also use location information 24 to retrieve check-in information via network 16. Network 16 may be any wired or wireless network that allows computing device 12 to access another computing device and/or the Internet. For example, computing device 12 may connect to network 16 to retrieve check-in information from remote server 18 (e.g., a computing device). Once computing device 12 requests the check-in information from remote server 18, remote server 18 may access remote database 20 to acquire portions of the check-in information. Remote server 18 may then compile the complete check-in information and deliver the check-in information back to computing device 12 via network 16.

In this manner, the ability of computer device 12 to access remote information via network 16 may increase an amount of information, a variety of information, and an accuracy of information available as the check-in information. With check-in information retrieved from another source, location information 24 stored within location device 22 may not need to be updated over time. Instead, the check-in information may be managed in a central server (e.g., remote server 18), a central database (e.g., remote database 20), or any web-based resource. Location information 24 may include a web address, remote server Internet protocol address, or any other such pointing data. Alternatively, location information 24 may include data in a form recognizable by computing device 12. For example, location information 24 may include data specific to a particular application installed in computing device 12. Upon obtaining location information 24, computing device 12 may select and open the application configured to interpret the location information. The application may then retrieve the check-in information from remote server 18 via network 16. Computing device 12 may employ one or more of these techniques to retrieve check-in information via network 16.

In one example, computing device 12 may obtain latitude and longitude coordinates from location information 24 and enter the latitude and longitude coordinates into an Internet-based mapping service. The Internet-based mapping service may then interface with remote server 18 via network 16 and subsequently generate check-in information associated with the destination of the coordinates, and computing device 12 may retrieve the check-in information from the mapping service. In other examples, location information 24 may include the name, city, and state or other address information of the destination. Computing device 12 may similarly utilize the Internet-based mapping service to retrieve associated check-in information based on the address information. In this example, computing device 12 may utilize network 16 to retrieve the check-in information.

In another example, location information 24 may include a web address. Computing device 12 may use the web address to access and retrieve check-in information from the web page or data identified by the web address. The check-in information may be managed by the owner or manager of location device 22. For example, location device 22 may be placed in a restaurant, and the restaurant may maintain the check-in information to which location information 24 directs customers' computing devices. Alternatively, the location information 24 may direct computing device 12 to a third-party managed site that provides check-in information associated with the location information of the particular location device 22.

The check-in information may contain any information related to the destination associated with location device 22. Therefore, check-in information may include any subset or subsets of destination information related to the destination. For example, the destination information may include any or all of a name of the destination, a description of the destination, a website link, a picture, a video, a rating, a review, and an event. Each of these elements of the destination information may be part of the check-in information updated in the user status. Although all of the destination information may be used to update the user status, only a subset of the destination information may be used as part of the check-in information in the user status. This subset of destination information may be automatically selected based on user preferences or previous user selections.

Alternatively, the subset of destination information used in the check-in information may be selected by the user. Computing device 12 may retrieve all of the destination information from remote server 18. Then, computing device 12 may be configured to allow the user to select which elements from the destination information to include in the check-in information posted in the user status. Computing device 12 may utilize user interface 14 to present the destination information and receive the user selections.

User interface 14 may include an input device and an output device so that the user can communicate with computing device 12. In one example user interface 14 may be a touch screen interface. In other examples, user interface 14 may include a display and one or more buttons, pads, joysticks, mice, or any other device capable of turning user actions into electrical signals that control computing device 12. In addition, computing device 12 may include one or more microphones, speakers, cameras, or tactile feedback devices to deliver information to the user or receive information. In any example, the user may interact with user interface 14 to provide input during the check-in process.

For example, user interface 14 may present the destination information to the user. The destination information may be in the form of a list, a drop down menu, icons, or any other presentation view. User interface 14 may then receive an information selection input from the user that selects at least one of the elements from the presented destination information. After the user selection is made, computing device 12 may update the user status with the user selected elements from the destination information as the check-in information. For example, the user may select the name of the destination and the event that the user is attending at the destination. In alternative examples, the user may request that computing device 12 retrieve alternative destination information or otherwise customize the check-in information as desired.

In alternative example, computing device 12 may completely automate the check-in process once computing device 12 obtains location information 24 from location device 22. For example, computing device 12 may automatically obtain location information 24 when location device 22 is in range of computing device 12. Computing device 12 may then automatically use location information 24 to automatically retrieve the check-in information from remote server 18 via network 16. Once computing device 12 has retrieved the check-in information, computing device 12 may automatically update the user status in the user account according to the retrieved check-in information. If the check-in information retrieved from remote server 18 includes destination information with multiple elements, computing device 12 may automatically select certain elements from the destination information. These automatically selected elements may be determined based on user selected preferences for certain types of elements in the check-in information, default elements identified within the destination information, or previous types of destination information selected by the user in past check-in processes. In this manner, the check-in information may be customizable for the user without the user always needing to manually select each element or the form of the check-in information posted in the user status.

The user may control any automated processes of the check-in process via preference menus, configuration settings, or other predefined criteria. In one example, user interface 14 may present a preference menu that enables the user to allow computing device 12 to automatically update the user status in the user account. This preference menu may provide various options for a fully or partially automatic check-in process. For example, user interface 14 may then receive user input that allows automatically updating the user status in the user account with computing device 12 in response to automatically obtaining the location information and automatically retrieving the check-in information.

In another example, user interface 14 may receive user input that requests computing device 12 prompt the user, at various stages of the check-in process, to confirm a presented action by computing device 12. In this manner, the user may require user interface 14 to confirm the check-in information prior to computing device 12 updating the user status with the check-in information. For example, user interface 14 may present a check-in prompt to the user in response to retrieving the check-in information and update the user status in response to receiving the check-in input from the user. According to these examples, user interface 14 may provide the user with any number of different options for customizing the level of autonomy of computing device 12 in the check-in process. The user may be capable of changing these preferences over time.

In addition to user selectable elements for check-in information, the user may be able to identify which contacts associated with the user account will be able to view the check-in information in the user status. For example, the user account may include multiple preselected contact groups. Each contact group may include contacts that have something in common to the user. Contacts may be grouped into "friends," "family," "co-workers," or the like. Since the user may only want to allow certain contacts to view the updated check-in information, user interface 14 may allow the user to select the contact groups that will have access to the check-in information. In this manner, computing device 12 may update the user status viewable or accessible by at least one preselected contact group associated with the user account.

The user may select the desired contact groups from a list of contact groups presented by user interface 14. Prior to updating the user status, user interface 14 may present the list of contact groups associated with the user account. User interface 14 may then receive a user selection of at least one of the contact groups, and computing device 12 may subsequently update the user status in response to the user selection. In other examples, the user may predefine the contact groups that may view check-in information in the user status. Alternatively, the user may allow certain contact groups to view check-in information from predetermined categories of destinations. For example, any check-in information associated with a restaurant may be viewable by the preselected contract group of "friends."

As described herein, the user account may be any electronic location where information about the user is provided. For example, the user account may be associated with one of more social networking services. Each of these social networking services may be accessed by the user using an application, web browser, or any other user interface that enables the user to interact with the service. In this manner, a social networking application may be associated with one or more social networking services. Therefore, computing device 12 may update the user status in one of more social networking service to which the user is logged in. The social networking service may accessed through a standalone social networking applications that operates with the operating system of computing device 12 and/or a social networking application that is a sub-routine built into an operating system running on computing device 12. With a social networking application built into the operating system as a sub-routine, the social networking service may be reachable without computing device 12 launching a separate application. Instead, the operating system may include the required functionality to directly interface with the social networking service (e.g., directly calling application programming interfaces (APIs) of the social networking service with the operating system of computing device 12).

If the social networking application is not already running on computing device 12, computing device 12 may automatically launch one or more social networking applications on computing device 12 in response to detecting location device 22 or receiving location information 24. This automatic launching of the social networking application may prevent the user from having to manually launch the application. The automatic launch may also allow computing device 12 to more quickly retrieve the check-in information from network 16 and update the user status with the check-in information.

In some examples, user interface 14 may present a list of multiple social networking services (or social networking applications available on computing device 12) to the user prior to updating the user status. From this list, the user may select one of more of the social networking services to post the check-in information. In this manner, the user may streamline the use of multiple social networking services. User interface 14 then receives the user selection of at least one of the plurality of social networking services and computing device 12 updates the user status in each of the social networking services selected by the user in response to receiving the user selection. If any applications required to access the selected social networking application are not running when selected, computing device 12 may also automatically launch the required social networking applications upon the selection.

Computing device 12 may also include techniques to handle errors in the check-in processes. For example, computing device 24 may not recognize or be able to interpret location information 24 received from location device 22. In this event, computing device 12 may prompt the user via user interface 14 to address this error in location information 24. User interface 14 may present the received location information 24 to the user. The user may then have the opportunity to modify location information 24 or simply manually enter the desired check-in information.

Remote server 18 and remote database 20 may each include one or more servers or databases, respectively. In this manner, remote server 18 and remote database 20 may be embodied as any hardware necessary to deliver check-in information, or destination information, to computing device 12 over network 16. Remote server 18 may include one or more desktop computers, mainframes, minicomputers, or other computing devices capable of executing computer instructions and storing data. Remote database 20 may include one or more memories, repositories, hard disks, or any other data storage device. In some examples, remote database 20 may be included within remote server 18.

Remote server 18 may connect to network 16. Network 16 may be embodied as one or more of the Internet, a wireless network, a wired network, a cellular network, or a fiber optic network. In other words, network 16 may be any data communication protocol that facilitates data between two or more devices.

In some examples, remote database 20 may include Relational Database Management System (RDBMS) software. In one example, remote database 20 may be a relational database and accessed using a Structured Query Language (SQL) interface that is well known in the art. Remote database 20 may alternatively be stored on a separate networked computing device and accessed by remote server 18 through a network interface or system bus. Remote database 20 may in other examples be an Object Database Management System (ODBMS), Online Analytical Processing (OLAP) database or other suitable data management system.

Various aspects of the disclosure may be operable only when the user has explicitly enabled such functionality. In addition, various aspects of the disclosure may be disabled by the user. Thus, a user may elect to prevent computing device 12 from requesting and/or check-in information from remote server 18. More generally, privacy controls may be applied to all aspects of the disclosure based on a user's privacy preferences to honor the user's privacy preferences for opting in or opting out of the functionality described in this disclosure.

Figure 2:
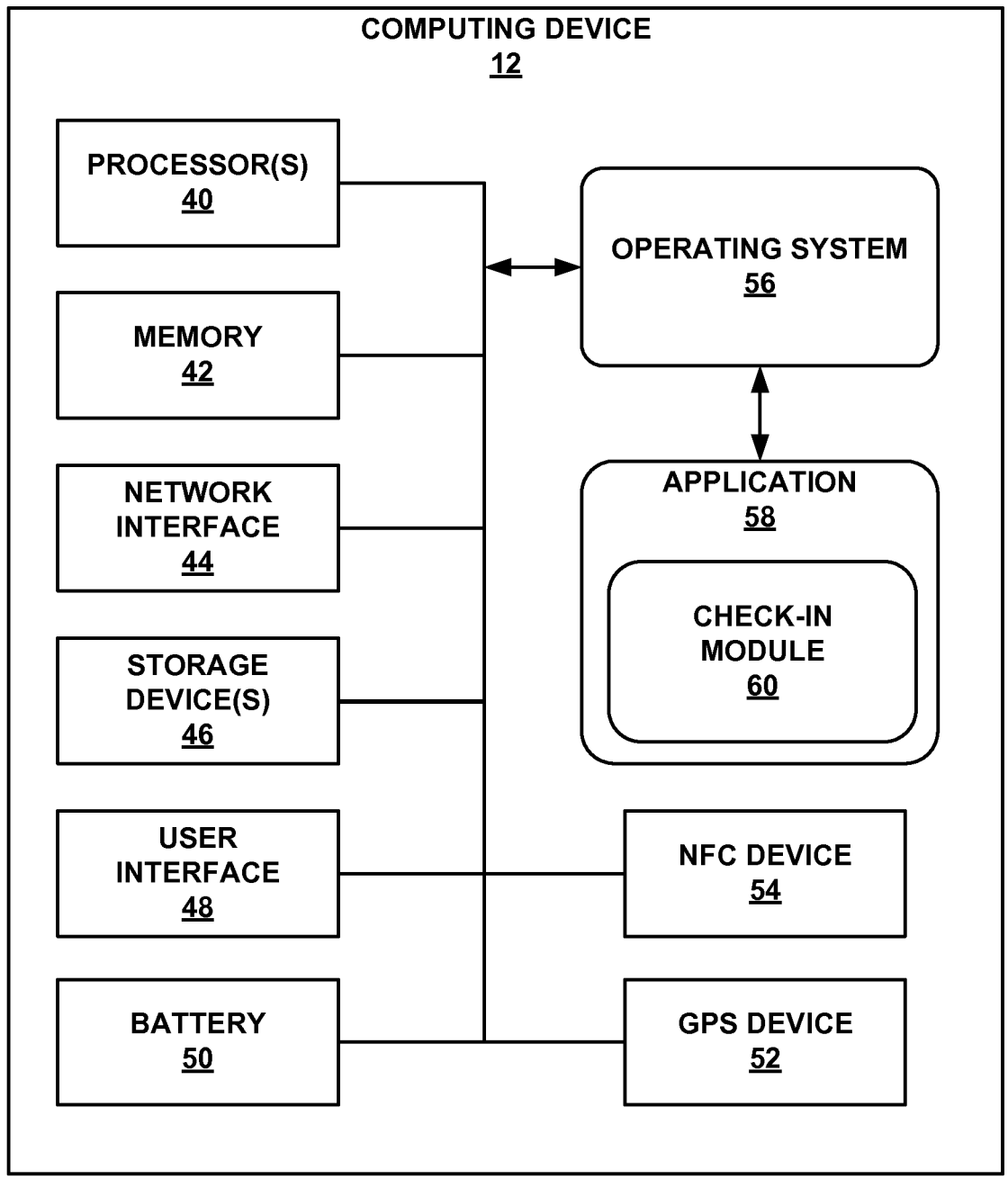
FIG. 2 is a block diagram illustrating components of one example of the computing device shown in FIG. 1, in accordance with one or more aspects of the present disclosure.

FIG. 2 is a block diagram illustrating components of example computing device 12 shown in FIG. 1. FIG. 2 illustrates only one particular example of computing device 12, and many other example embodiments of computing device 12 may be used in other instances. For example, computing device 12 may include additional components and run multiple different applications.

As shown in the specific example of FIG. 2, computing device 12 includes one or more processors 40, memory 42, a network interface 44, one or more storage devices 46, user interface 48, battery 50, GPS device 52, and NFC device 54. Computing device 12 also includes an operating system 56, which may include modules and/or applications that are executable by processors 40 and computing device 12. Computing device 12, in one example, further includes one or more applications 58 and check-in module 60. One or more applications 58 and check-in module 60 are also executable by computing device 12. Each of components 40, 42, 44, 46, 48, 50, 52, 54, 56, 58, and 60 may be interconnected (physically, communicatively, and/or operatively) for inter-component communications.

Processors 40, in one example, are configured to implement functionality and/or process instructions for execution within computing device 12. For example, processors 40 may be capable of processing instructions stored in memory 42 or instructions stored on storage devices 46. These instructions may define or otherwise control the operation of operating system 56, application 58, and check-in module 60.

Memory 42, in one example, is configured to store information within computing device 12 during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on computing device 12 (e.g., one or more of applications 58) to temporarily store information during program execution.

Storage devices 46, in some examples, also include one or more computer-readable storage media. Storage devices 46 may be configured to store larger amounts of information than memory 42. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 12, in some examples, also includes a network interface 44. Computing device 12, in one example, utilizes network interface 44 to communicate with external devices via one or more networks, such as network 16 in FIG. 1. Network interface 44 may be a network interface card, such as an Ethernet card, an optical transceiver, a radio frequency transceiver, or any other type of device that can send and receive information. Other examples of such network interfaces may include Bluetooth, 3G and WiFi radios in mobile computing devices as well as USB. In some examples, computing device 12 utilizes network interface 44 to wirelessly communicate with an external device (not shown) such as a server, mobile phone, or other networked computing device.

Computing device 12, in one example, also includes one or more user interfaces 48. User interface 48 may be an example of user interface 14 described in FIG. 1. User interface 48 may be configured to receive input from a user (e.g., tactile, audio, or video feedback). User interface 48 may include a touch-sensitive and/or a presence-sensitive screen, mouse, a keyboard, a voice responsive system, or any other type of device for detecting a command from a user. In some examples, user interface 48 includes a touch-sensitive screen, mouse, keyboard, microphone, or camera.

User interface 48 may also include, combined or separate from input devices, output devices. In this manner, user interface 48 may be configured to provide output to a user using tactile, audio, or video stimuli. In one example, user interface 48 may include a touch-sensitive screen, sound card, a video graphics adapter card, or any other type of device for converting a signal into an appropriate form understandable to humans or machines. In addition, user interface 48 may include a speaker, a cathode ray tube (CRT) monitor, a liquid crystal display (LCD), or any other type of device that can generate intelligible output to a user.

Computing device 12, in some examples, include one or more batteries 50, which may be rechargeable and provide power to computing device 12. Battery 50, in some examples, is made from nickel-cadmium, lithium-ion, or other suitable material. In other examples, battery 50 may be a power source capable of providing stored power or voltage from another power source.

Computing device 12 may also include one of more GPS devices 52. GPS device 52 may include one or more satellite radios capable of determining the geographical location of computing device 12. Computing device 12 may utilize GPS device 52 to confirm the validity of location information 24 or provide additional location information used to retrieve the check-in information via network 16.

In addition, computing device 12 may include one or more NFC devices 54. As described herein, NFC device 54 may be active hardware that is configured to obtain location information from location device 22. In general, NFC device may be configured to communicate wirelessly with other devices in physical proximity to NFC device 54 (e.g., approximately 0-100 meters). In other examples, NFC device 54 may be replaced with an alternative short-range communication device configured to obtain location information 24 from location device 22. These alternative short-range communication devices may operate according to Bluetooth, Ultra-Wideband radio, or other similar protocols.

Computing device 12 may include operating system 56. Operating system 56, in some examples, controls the operation of components of computing device 12. For example, operating system 56, in one example, facilitates the interaction of application 58 or check-in module 60 with processors 40, memory 42, network interface 44, storage device 46, input device 48, output device 50, battery 52, GPS device 52, and NFC device 54.

Application 58 may be a social networking application or other application associated with the user account to be updated with the check-in information. Application 58 may control or facilitate how and when the user status is updated with the check-in information. Although application 58 may be software independent from operating system 56, application 58 may be a sub-routine of operating system 56 in other examples.

Application 58 may utilize check-in module 60 to facilitate the check-in process. Check-in module 60 may be contained within application, or in other examples, utilized by application 58. Check-in module may include instructions that cause NFC device 54 to obtain location information 24 from location device 22, retrieve check-in information, update the user status with the check-in information, and any other steps associated with the check-in process. For example, check-in module 60 may instruct NFC device 54 to obtain location information 24 whenever location device 22 is detected by NFC device 54. In some examples, check-in module may run separately from application 58, or even as a sub-routine of operating system 56. In this manner, check-in module 60 may be able to instruct operating system 56 to launch application 58 in the event that application 58 is not running when location device 22 is in close physical proximity to computing device 12.

Any applications (e.g., applications 58 or check-in module 60) implemented within or executed by computing device 12 may be implemented or contained within, operable by, executed by, and/or be operatively/communicatively coupled to components of computing device 12 (e.g., processors 40, memory 42, network interface 44, and/or storage devices 46).

Figure 3:
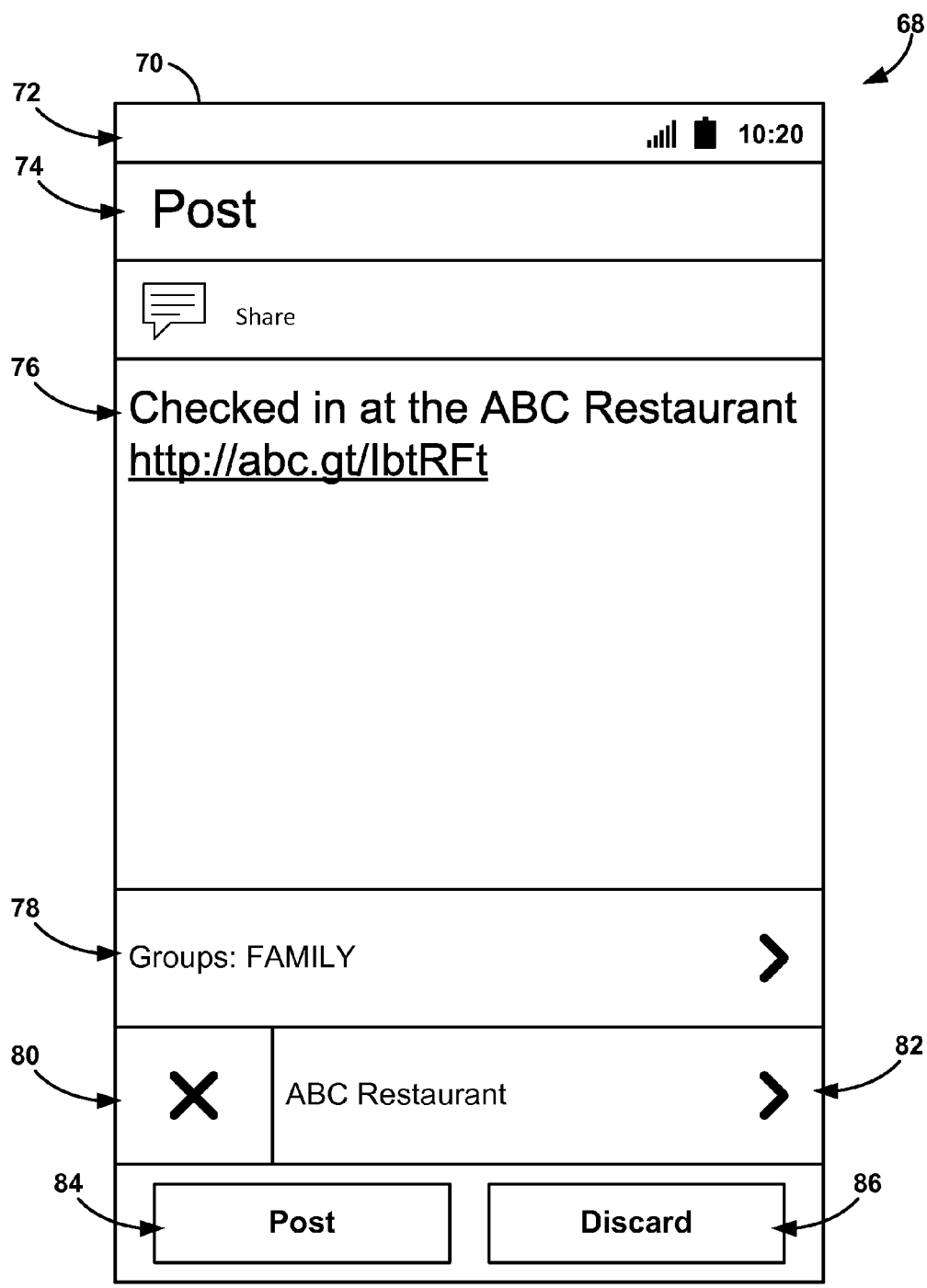
FIG. 3 is an illustration of an example user interface for updating a user status in a user account, in accordance with one or more aspects of the present disclosure.

FIG. 3 is an illustration of example user interface 68 for updating a user location to a user account. User interface 68 is an example of user interface 14 and 48. As shown in FIG. 3, user interface 68 presents screen 70 to the user via computing device 12. Screen 70 includes status bar 72, identification bar 74, status field 76, groups menu 78, clear button 80, destination information menu 82, post button 84, and discard button 86. Screen 70 may be an example screen within application 58 of FIG. 2 (e.g., a social networking application) running on computing device 12.

Status bar 72 may include one or more icons that indicate the status of computing device 12 and/or applications running on computing device 12. For example, status bar 72 may present a time of day, battery charge level, network signal strength, application updates, received messages, or even notification that location information has been received from location device 22. Identification bar 74 indicates to the user what type of screen the user is currently viewing. As shown in FIG. 3, identification bar 74 indicates that the user is viewing the "Post" screen that allows the user to post or update the user status.

Status field 76 presents the information that will be used to update the user status. In other words, the check-in information that will be posted to the user status would be presented in status field 76 prior to updating the user status. As shown in the example of FIG. 3, the check-in information is listed as "Checked in at the ABC Restaurant http://abc.gt/lbtRFt." This check-in information may have been retrieved from remote server 18, for example, based on the location information 24 obtained from location device 22. Location device 22 may have been physically located within ABC Restaurant when the user placed computing device 12 within close physical proximity to location device 22. In some examples, status field 76 may be configured to display pictures, icons, video, or any other media as check-in information.

The check-in information provided in status field 76 includes the name of the destination and a link that directs a user to a website. The website may be the website of ABC Restaurant or any other website associated with that destination. This type of check-in information may be the default form of the check-in information. However, the user may customize what type of check-in information is posted to the user status. The user may select destination information menu 82 to view a greater variety of destination information (e.g., a plurality of elements associated with the destination). This destination information is further described in FIG. 5. The user may also clear or erase the destination and check-in information from status field 76 by selecting clear button 80.

In addition, screen 70 may allow the user select the contacts that will be able to view the check-in information in the user status. In some cases, the user may not want all contacts associated with the user account to view the check-in information. Therefore, screen 70 may provide groups menu 78. Groups menu 78 may list the currently selected groups of contacts that will be able to view the updated user status. In addition, the user may select groups menu 78 to view a list of available contact groups. This list of contact groups is further described in FIG. 4. Although the user may be able to select the contact groups from groups menu 78, user interface 68 may present one or more default contact groups based on the type of destination and/or user preferences.

Once the user is satisfied with the check-in information that will be posted in status field 76, the user may select post button 84 to initiate updating of the user status with the displayed check-in information. If the user does not want to update the user status with the check-in information, the user may press discard button 86 to return to another screen of user interface 68.

Screen 70 may be presented to the user when the user has not selected to make the entire check-in process automatic. In other words, screen 70 provides an opportunity to the user to confirm the retrieved check-in information or change the check-in information. In some examples, screen 70 may be the only screen in which a user input is required to update the user status with the check-in information. After computing device 12 automatically obtains location information 24 from location device 22 and subsequently retrieves the check-in information, the user may simply need to provide a single input of selecting post button 84. In other examples, the user may be prompted to provide additional input (e.g., accept the launch of application 58), allow computing device 12 to access remote server 18 via network 16, or any other user preferred manual step. However, in any example, the user does not need to manually obtain or enter check-in information because of the location information obtained from location device 22.

In alternative examples, computing device 12 may not present screen 70 to the user. If the user has determined that the check-in process is to be fully automated by computing device 12, then computing device 12 may automatically update the user status with the check-in information whenever location information 24 is obtained from a location device 22. However, even in fully automated check-in mode, computing device 12 may, in some examples, signal to the user that the user status was updated. For example, computing device 12 deliver an audible indication and/or a status icon in status bar 72 that indicates check-in information was successfully posted to the user status of the user account.

Screen 70 may also be formatted to facilitate use in a touch screen user interface 68. In other words, all of the user inputs may be large enough for a user to touch with a single finger. Alternatively, screen 70 may be formatted to include smaller user inputs when a pointing device may be used to select input buttons.

Figure 4:
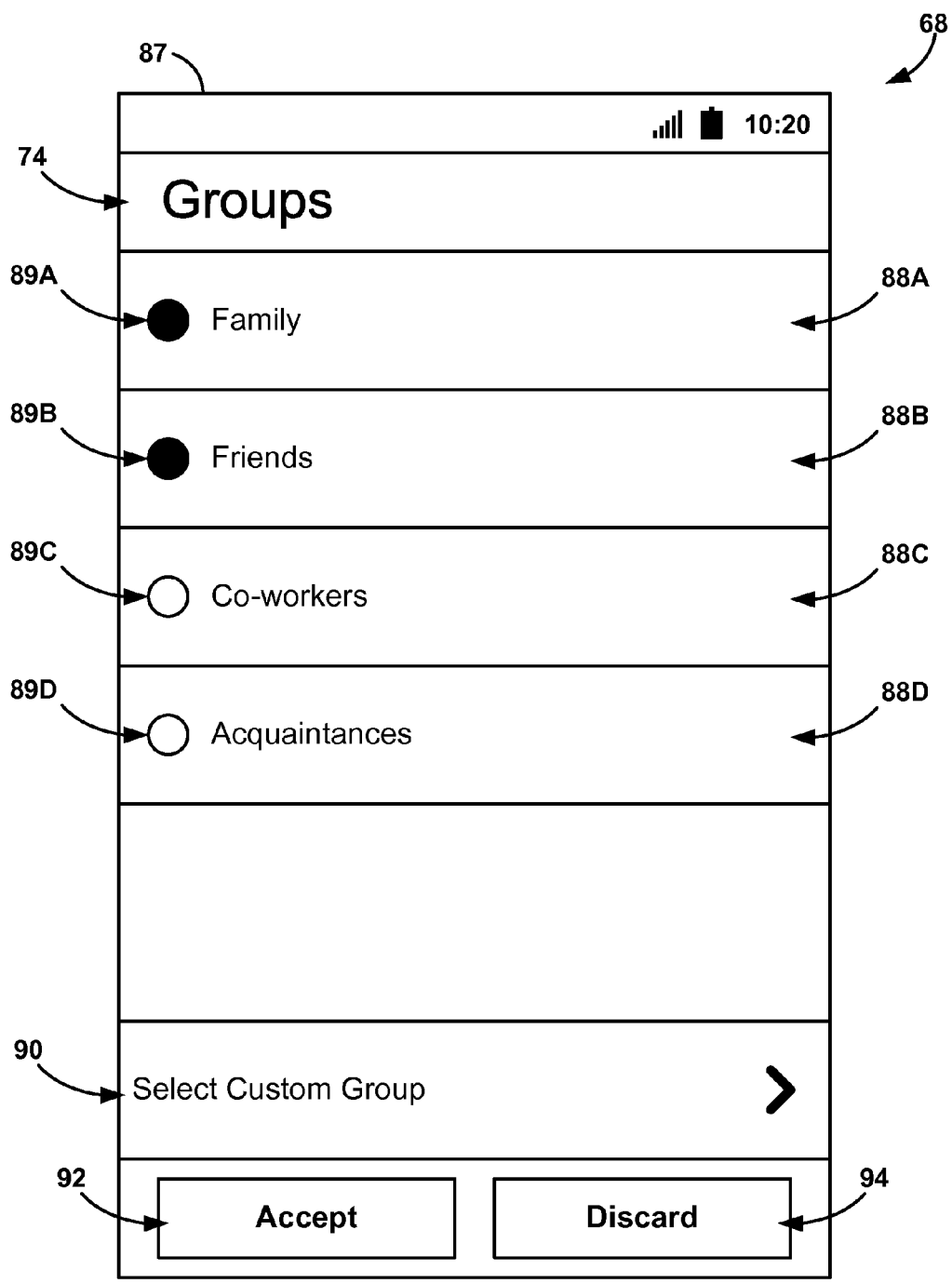
FIGS. 4 and 5 are illustrations of example user interfaces for user selectable contact groups and destination information for updating the user status, in accordance with one or more aspects of the present disclosure.
Figure 5:
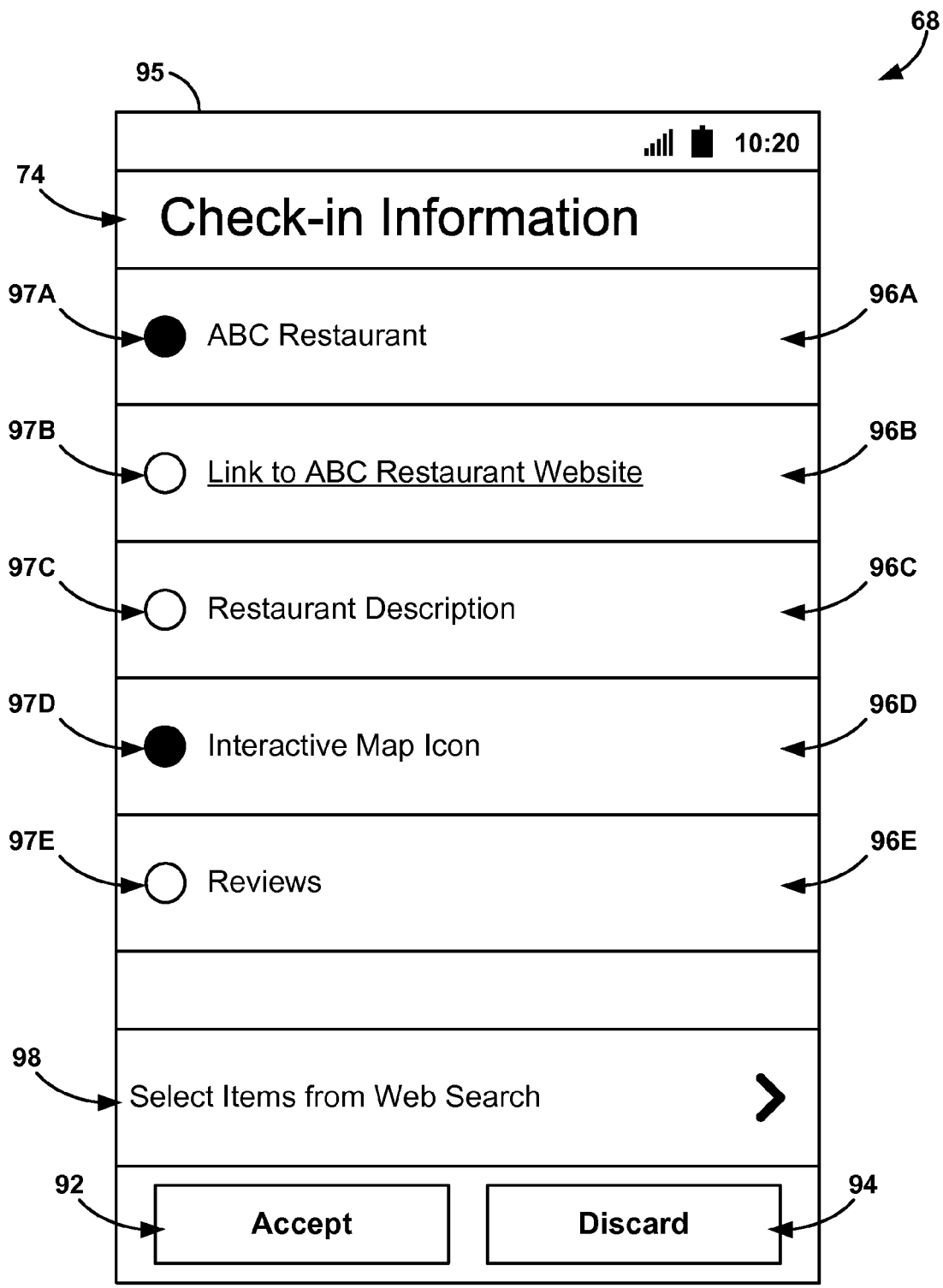

FIGS. 4 and 5 are illustrations of example user interfaces 68 for user selectable contact groups and destination information for updating the user status. User interface 68 is an example of user interface 14 and 48. As shown in FIG. 4, user interface 68 includes screen 87. Screen 87 includes identification bar 74, custom group menu 90, accept button 92, and discard button 94. Screen 87 also includes group 88A, 88B, 88C, and 88D (collectively "groups 88"). Identification bar 74 indicates that the user is viewing the preselected "Groups" of contacts associated with the user account. As described herein, screen 87 may be displayed after groups menu 78 has been selected in screen 70 of FIG. 3.

Each of groups 88 is a different set of contacts associated with the user account. Although each of groups 88 may be different, some contacts may be present in more than one contact group. As shown in FIG. 4, the user has four different contact groups. Group 88A includes all contacts in the "Family" group, group 88B includes all contacts in the "Friends" group, group 88C includes all contacts in the "Co-workers" group, and group 88D includes all contacts in the "Acquaintances" group. Each of groups 88 may have been predetermined or preselected by the user in the user account. In other words, each user may have more or less than four groups 88, and each of groups 88 may labeled with any word the user desires.

Each of groups 88 also includes separate indicators 89A, 89B, 89C, and 89D (collectively "indicators 89"). When the user desires to include one of groups 88 as a group of contacts that will be able to view the updated check-in information, the user may select that particular group 88 to toggle the respective indicator 89. When the indicator 89 is filled in, the group has been selected. To the contrary, empty indicators 89 indicate that the group has not been selected. As shown in FIG. 4, groups 88A and 88B have been selected because indicators 89A and 89B are filled in. Therefore, the check-in information would be updated and accessible to the contacts in the group labeled "Family" and the group labeled "Friends." In other examples, groups 88 may indicate their selected status using a different technique. For example, a selected group 88 may change color, be shaded in, or change the font of the group name. Alternatively, the user may move selected groups 88 to different areas of screen 87 to indicate the selection (e.g., selected groups 88 may be dragged to a selected area while unselected groups 88 may remain in the unselected area).

Instead of selecting one of the preselected contact groups of groups 88, the user may instead desire to allow a customized group of contacts to access the check-in information once posted in the user status. The user may select custom group menu 90 to view a list of all available contacts. Then, the user may select all of the contacts desired, and user interface 68 may store the selected contacts as a group specific to the current check-in information.

Once the user has selected the desired contact groups to access the check-in information, the user may select accept button 92. If the user does not want to keep any changes to the contact groups, the user may select discard button 94. After either accept button 92 or discard button 94 is selected, user interface 68 may return to screen 70 of FIG. 3.

As shown in FIG. 5, user interface 68 presents screen 95. Screen 95 includes identification bar 74, custom info menu 98, accept button 92 and discard button 94. Identification bar 74 identifies that screen 95 presents various check-in information, or destination information, that has been retrieved based on location information 24. Screen 95 may be presented to the user after selection of destination information menu 82 in screen 70 of FIG. 3. Destination elements 96A, 96B, 96C, 96C, 96D, and 96E (collectively "destination elements 96") contain the available destination information that the user may select as the check-in information for the user status.

In the example of FIG. 5, five different destination elements 96 were retrieved based on location information 24. Destination element 96A is the name of the destination, "ABC Restaurant." Destination element 96B is a link to the website of the destination. Destination element 96C is a description of the destination. Destination element 96D is an interactive map icon of the destination. Once posted in the user status, any other contact may select the interactive map icon to see the geographical location of the destination. Destination element 96E includes reviews of the destination. Reviews may be provided by the destination or by a third party review service. Destination elements 96 of FIG. 5 are merely example elements of destination information. In other examples, destination information may include as few as one or more than twenty different destination elements. Each of destination elements 96 also includes a respective indicator 97A, 97B, 97C, 97D, and 97E (collectively "indicators 97").

The user may use screen 95 to select the desired destination elements to include in the check-in information. When the user desires to include one of destination elements 96 as a part of the user status, the user may select that particular destination element 96 to toggle the respective indicator 97. When the indicator 97 is filled in, the respective destination element has been selected. To the contrary, empty indicators 97 indicate that the destination element has not been selected. As shown in FIG. 5, destination elements 96A and 96D have been selected because indicators 97A and 97D are filled in. Therefore, the check-in information used to update the user status would include the name of the destination and the interactive map icon. In other examples, destination elements 96 may indicate their selected status using a different technique. For example, a selected destination element 96 may change color, be shaded in, or change the font of the group name. Alternatively, the user may move selected destination elements 96 to different areas of screen 95 to indicate the selection (e.g., selected destination elements 96 may be dragged to a selected area while unselected destination elements 96 may remain in the unselected area).

Instead of selecting one or more of destination elements 96, the user may instead desire to update the user status with a customized list of destination elements. The user may select custom info menu 98 to view alternative items from a web search or other database based on the destination identified by location information 24. Then, the user may select the desired items, and user interface 68 may store the selected web items as the check-in information for updating the user status.

Once the user has selected the desired destination elements for the check-in information, the user may select accept button 92. If the user does not want to keep any changes to the selected destination elements, the user may select discard button 94. After either accept button 92 or discard button 94 is selected, user interface 68 may return to screen 70 of FIG. 3. Status field 76 may then be updated to reflect the destination elements selected by the user in screen 95.

Figure 6A:
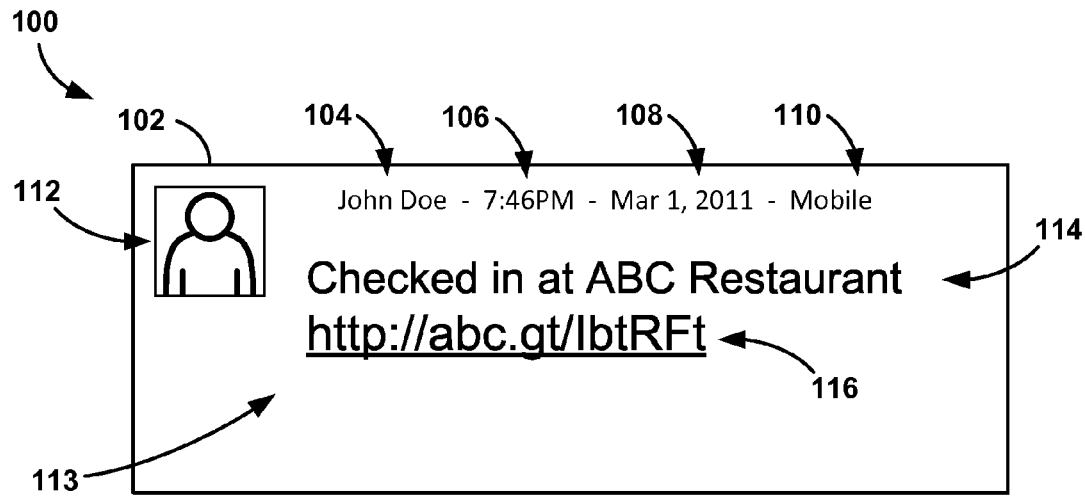
FIGS. 6A and 6B are illustrations of example user interfaces for updated user status in a user account with check-in information, in accordance with one or more aspects of the present disclosure.
Figure 6B:

FIGS. 6A and 6B are illustrations of an example user interface 100 for updated user status in a user account with check-in information. User interface 100 of FIGS. 6A and 6B may be provided on any computing device of a contact associated with a user account, including the user of the user account. In some examples, user interface 100 may be a part of the social networking application associated with the user account. The user may also view screens 102 and 120 using computing device 12.

In the example of FIG. 6A, screen 102 presents the user status with two destination elements as a part of the check-in information. Screen 102 includes user name 104, entry time 106, entry date 108, user device 110, and user icon 112. User icon may be a picture or other image selected by the user and viewable by user contacts associated with the user account. In addition, screen 102 presents user status 113. User status 113 includes destination name 114 and a web site link 116 to a website associated with the destination. User status 113 may be presented if the user selected post button 84 of screen 70 in FIG. 3.

FIG. 6B presents alternative check-in information in screen 120. In this example, user status 121 includes destination name 122 and interactive map icon 124. A contact may select interactive map icon 124 to launch a map on the contact computing device to view the geographical location of the destination. In some examples, the map may be an Internet-based mapping service that stores additional information about the destination.

Figure 7:
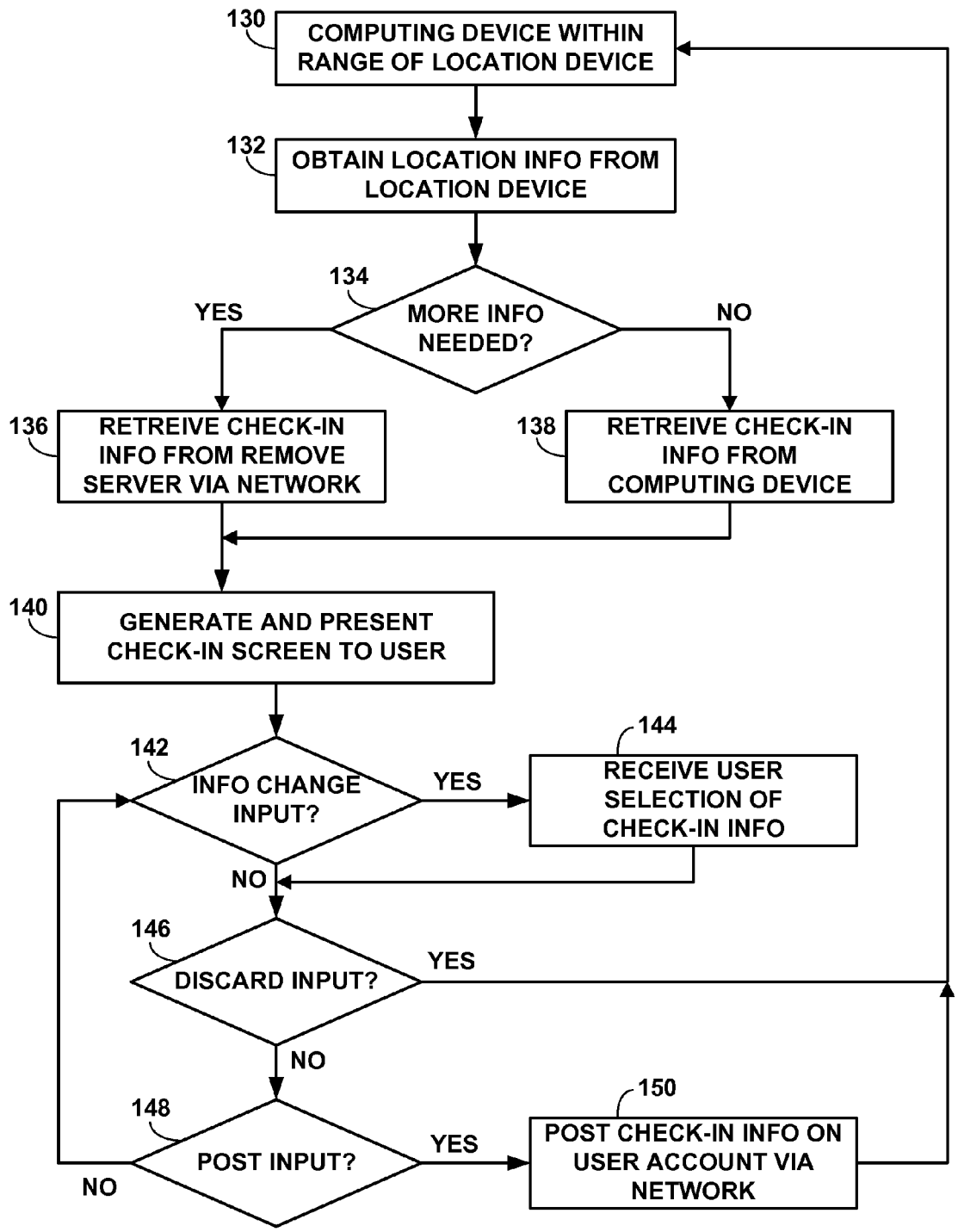
FIG. 7 is a flow diagram illustrating an example process that may be performed by a user computing device to update a user status with check-in information based on location information obtained from a location device, in accordance with one or more aspects of the present disclosure.

FIG. 7 is a flow diagram illustrating an example process that may be performed by user computing device 12 to update a user status with check-in information based on location information 24 obtained from location device 22. As shown in FIG. 7, user computing device 12 includes NFC device 54 enabled and ready to detect location device 22 and obtain location information 24. The user first brings computing device 12 within the communication range of NFC device 54 and location device 22 (130). Once computing device 12 is within the range of location device 22, NFC device 54 obtains location information 24 from location device 22 (132).

If computing device 12 does not require more check-in information than is stored in memory 42 or storage devices 46 of computing device ("NO" branch of block 134), then computing device 12 may retrieve the check-in information from one or both of memory 42 or storage devices 46 (138). Computing device 12 may cache information downloaded from the Internet and/or have a database of some check-in information. For example, computing device 12 may retain a mapping database that can be used to retrieve the check-in information based on the obtained location information. In another example, the location information may have been previously obtained by computing device 12 and the check-in information previously retrieved via network 16 may still be stored by computing device 12. However, computing device 12 may be configured to update the user status with the most current check-in information available.

If computing device 12 requires more check-in information than available in computing device 12 ("YES" branch of block 134), computing device 12 may retrieve the check-in information from remote server 18 via network 16 (136). In this manner, computing device 12 may use location information obtained from location device 22 as a pointing device to an alternative source of information. As described herein, the retrieved check-in information may include destination information from which the user may select desired elements for updating the user status.

Once the check-in information is retrieved by computing device 12, processors 40 may generate the check-in screen (e.g., screen 70 of FIG. 3) and user interface 48 may present the check-in screen to the user (140). If there is any input from the user to change the check-in information ("YES" branch of block 142), user interface 48 may receive the user selection and modify the check-in information to be presented in the user status (144). As described herein, this user selection may select one or more destination elements to be included with the check-in information.

If user interface 48 receives a discard input from the user (e.g., discard button 86) ("YES" branch of block 146), computing device 12 may discard the location information and check-in information and continue to determine if another location device 22 is detected (130). If there is no discard input ("NO" branch of block 146) and no post input ("NO" branch of block 148), computing device 12 continues to monitor for any user input to change the check-in information (142). If user interface 48 receives a post input (e.g., selection of post button 84) ("YES" branch of block 148), computing device 12 posts the check-in information as the user status on the user account via network 16 (150). Computing device 12 may then continue to use NFC device 54 to determine if another location device 22 is detected (130).

The process of FIG. 7 is just an example method for a user to check-in at a destination using location device 22. In other examples, the check-in process may be completely automated by computing device 12 such that the user need only place computing device 12 within the range of communication between communication device 12 and location device 22. However, even with minimal user input, this technique eliminates the need for the user to manually select or initially find check-in information. In addition, the user may be presented with a variety of destination elements that may be up to date as managed by the provider of location device 22, without the need to update location information obtained from location device 22. In this manner, using location information 24 as a pointing device to additional data may be beneficial to computing devices with access to network 16.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other embodiments are within the scope of the following claims.

What is claimed is:

1. A method comprising:
obtaining, by a computing device, location information from a target device using near field communication, wherein the location information instructs the computing device to retrieve check-in information from at least one information source different than the target device;
retrieving, by the computing device, the check-in information from the at least one information source different than the target device, wherein:
the check-in information is based on the location information obtained from the target device; and
the check-in information comprises information having additional details about a destination associated with the target device than the location information;
updating, by at least the computing device, a user status in a user account with the check-in information; and
automatically launching a social networking service for execution by the computing device in response to detecting the target device using near field communication, wherein the user account is associated with the social networking service.

2. The method of claim 1, wherein the location information includes a command, the method further comprising:
executing the command with the computing device to retrieve the check-in information from at least one information source different from the target device.

3. The method of claim 1,
wherein the location information comprises latitude and longitude coordinates, and
wherein the check-in information comprises a name of the destination corresponding to the latitude and longitude coordinates.

4. The method of claim 1, wherein retrieving check-in information comprises retrieving check-in information from an Internet-based mapping service.

5. The method of claim 1, wherein retrieving check-in information comprises retrieving check-in information from a second computing device over a network.

6. The method of claim 1, wherein retrieving check-in information comprises retrieving check-in information from a database stored on the computing device.

7. The method of claim 1,
wherein the check-in information comprises destination information related to the destination associated with the target, and
wherein the destination information comprises at least one of a name of the destination, a description of the destination, a website link, a picture, a video, a rating, and an event.

8. The method of claim 7, further comprising:
presenting the destination information on a display of the computing device;
receiving selection of at least one element of the presented destination information; and
updating the user status based on the at least one selected element.

9. The method of claim 1, wherein updating the user status comprises automatically updating the user status in the user account with the computing device in response to automatically obtaining the location information and automatically retrieving the check-in information.

10. The method of claim 1, further comprising receiving configuration information that configures the computing device to automatically update the user status in the user account in response to automatically obtaining the location information and automatically retrieving the check-in information.

11. The method of claim 1, further comprising receiving a check-in input that initiates updating the user status in the user account with the check-in information.

12. The method of claim 1, wherein updating the user status comprises:
enabling at least one preselected contact group associated with the user account access to the updated user status, wherein the at least one preselected contact group is one of a plurality of preselected contact groups associated with the user account.

13. The method of claim 1, further comprising:
receiving a user selection of at least one preselected contact group associated with the user account prior to updating the user status; and
updating the user status in response to receiving the selection.

14. The method of claim 1, wherein the user account is associated with a social networking service that is a subroutine built into an operating system running on the computing device.

15. The method of claim 1, further comprising:
receiving a selection of at least one of a plurality of social networking applications executable on the computing device; and
updating the user status in the at least one selected social networking application selected responsive to receiving the selection.

16. The method of claim 1, wherein the computing device includes active near field communication hardware, and wherein the target device includes passive near field communication hardware.

17. The method of claim 1, wherein the computing device includes active near field communication hardware, and wherein the target device includes active near field communication hardware configured to emulate passive near field communication hardware.

18. A computer-readable storage medium encoded with instructions that cause one or more processors of a computing device to:
obtain location information from a target device using near field communication, wherein the location information instructs the computing device to retrieve check-in information from at least one information source different than the target device;
retrieve the check-in information from the at least one information source different than the target device, wherein:
the check-in information is based on the location information obtained from the target device; and
the check-in information comprises information having additional details about a destination associated with the target device than the location information; and
update a user status in a user account with the check-in information; and
automatically launch a social networking service for execution by the computing device in response to detection of the target device using near field communication, wherein the user account is associated with the social networking service.

19. A computing device comprising:
a near field communication module configured to obtain location information from a target device, wherein the location information instructs the computing device to retrieve check-in information from at least one information source different than the target device; and
a processor configured to retrieve the check-in information from the at least one information source different than the target device and update a user status in a user account with the check-in information, wherein
the check-information is based on the location information obtained from the target device,
the check-in information comprises information having additional details about a destination associated with the target device than the location information, and
the processor is configured to automatically launch a social networking service for execution by the computing device in response to detection of the target device using near field communication, wherein the user account is associated with the social networking service.

* * * * *